June 11, 1963 F. C. AEBERSOLD 3,093,007

COUNTERSHAFT GEARING NOISE ELIMINATOR

Filed Nov. 14, 1961

INVENTOR.
Frederick C. Aebersold.
BY
Harness and Harris
ATTORNEYS.

United States Patent Office 3,093,007
Patented June 11, 1963

3,093,007
COUNTERSHAFT GEARING NOISE ELIMINATOR
Frederick C. Aebersold, Detroit, Mich., assignor to Chrysler Corporation, Highland Park, Mich., a corporation of Delaware
Filed Nov. 14, 1961, Ser. No. 152,302
13 Claims. (Cl. 74—325)

This invention relates to a means for eliminating gear rattle in countershaft gearing assemblies and particularly gearing assemblies such as those used in manually shifted, sliding gear, motor vehicle, multiple speed, drive train transmissions.

It is a primary object of this invention to provide a gear rattle eliminator that can be readily and economically incorporated in the current type of manually shifted, sliding gear, motor vehicle drive train transmission without introducing complexities or problems as regards the manufacture and/or operation of the transmission or its components.

It is still another object of this invention to provide a friction damping means that will be automatically activated by the transmission of drive through the transmission to eliminate gear rattle that may be the result of rotation of meshing unloaded gears of the transmission.

It is a further object of this invention to interconnect a transmission gear and its supporting shaft by means such that transmission of drive through said gear will cause relative axial movement between the gear and its shaft to activate a friction damping means that prevents or eliminates gear noises associated with other gears of the transmission.

Figure 1:
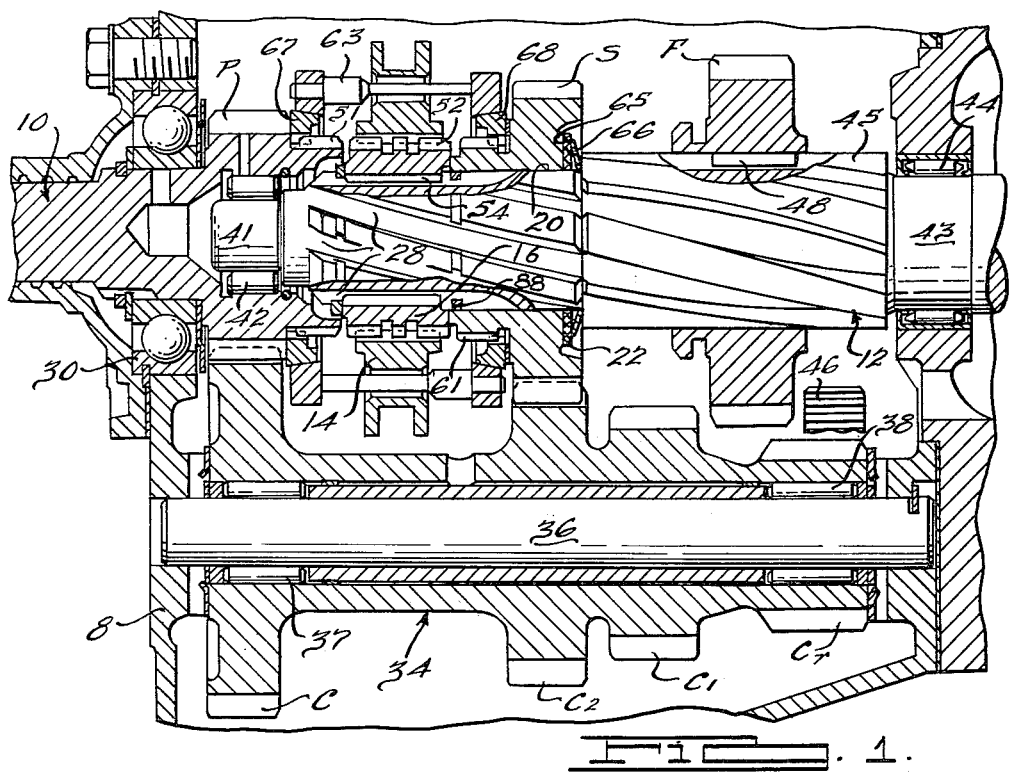
Figure 2:
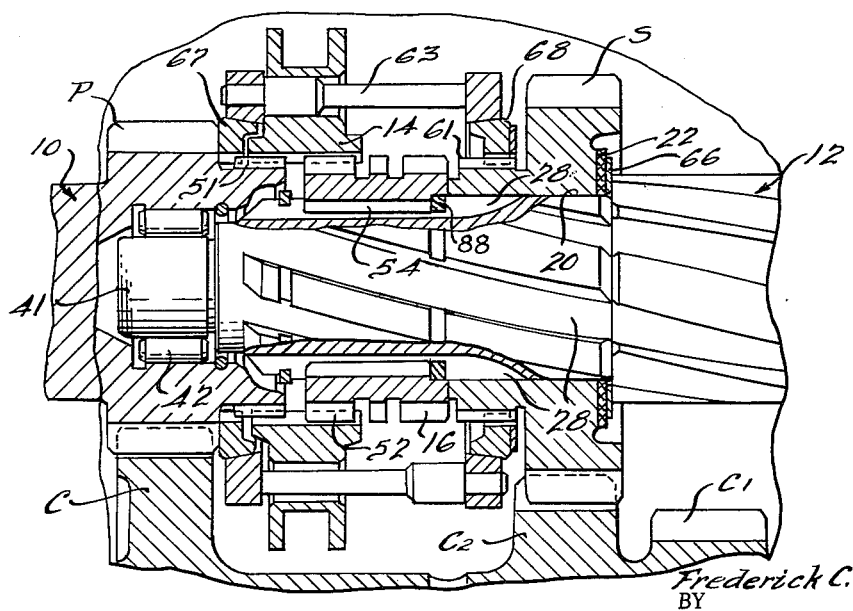

Other objects and advantages of this invention will be readily apparent from a reading of the following description and a consideration of the related drawings wherein:

FIG. 1 is a sectional elevational view of a countershaft type, sliding gear, manually shifted multi-speed transmission adapted for motor vehicle drive trains which transmission embodies this invention, the transmission being shown in neutral condition; and FIG. 2 is an enlarged, fragmentary sectional elevational view of a portion of the transmission shown in FIG. 1, with the transmission gearing being shown conditioned for the transmission of direct drive between the transmission input and output gears.

Manual transmission gear rattle results from variation in the speed of input shaft 10 causing the teeth of the drive pinion P and cluster gear C and the teeth of the cluster gear $C_2$ and second speed gear S to loose contact and then recontact with an impact emitting the troublesome gear rattle sound. The variations in input shaft angular velocity are caused by engine firing impulses and are greatest at low speeds.

In normal high gear or direct drive operation the input shaft 10 is drivingly locked to the output shaft 12 through the clutch gear sleeve 14 and the clutch gear 16 which is connected by helical splines 28 to the output shaft 12. The second speed gear S however is rotating at a lower speed than the output shaft 12 because it is geared through the cluster gears $C_2$, C to the drive pinion P. The second speed gear S is free to rotate on surface 20 of the output shaft 12. When proper friction is applied between the second speed gear S and the output shaft 12 with a friction washer 22, or an equivalent means, the rattle surfaces of the several unloaded gears remain in contact and the transmission does not produce gear rattle noise.

This invention presents a preferred method of applying friction between the second speed gear S and the output shaft 12 that eliminates rattle without disturbing the shift characteristics of the transmission. Instead of cutting the splines 28 between the front end of the output shaft 12 and the clutch gear 16 straight or parallel to the output shaft axis of rotation, this invention proposes rolling or cutting the splines 28 on the output shaft 12 and on the inside of the clutch gear 16 at an angle to the shaft axis of rotation and this will cause the clutch gear 16 to push back against the second speed gear S and the thrust friction washer 22 when torque is applied from the clutch gear sleeve 14 to the clutch gear 16. The correct angle for the splines 28 must be determined from the friction characteristics of the thrust friction washer 22 and the input torque applied to the clutch gear 16 as various types of engines have varying torque output and firing pulse intensities. It should be pointed out that with manually shifted power transmission units the input shaft 10 is usually connected to the crankshaft of the vehicle engine by a friction clutch so there is no fluid torque converter or fluid coupling to absorb engine generated pulsations or vibrations that act to develop gear rattle in unloaded constantly meshed transmission gears such as the gears C, $C_2$ and S of the disclosed transmission.

FIG. 1 shows a multi-speed, sliding gear, countershaft type power transmission unit comprising a box-like housing 8 that rotatably journals a pair of axially aligned input and output shafts 10 and 12 respectively. Input shaft 10, that is adapted to be drivingly connected to an engine crankshaft (not shown), is journaled in the housing 8 by means of a ball bearing assembly 30. Input shaft 10 has integrally formed on its rear end portion the drive pinion P that is meshingly engaged with the cluster input gear C of the countershaft gear cluster assembly 34. The countershaft gear cluster assembly 34 includes in addition to the cluster input gear C, the cluster second speed gear $C_2$, the cluster first speed gear $C_1$ and the reverse drive gear $C_r$. The cluster gear assembly 34 is journaled on the housing supported countershaft 36 by means of the spaced roller bearing assemblies 37, 38.

The transmission output shaft 12 has its reduced diameter forward end portion 41 piloted in the rear end of the input shaft 10 by means of a roller bearing assembly 42. The rear end portion 43 of the output shaft 12 is journaled in housing 8 by means of a roller bearing assembly 44. The rear portion 45 of the output shaft 12 is helically splined to seat, by an axially slidable, drive transmitting, toothed connection 48, the first speed and reverse shifter gear F. Forward shift of gear F to engage cluster first speed gear $C_1$ will provide means for the transmission of a low or first speed forward drive from drive pinion P to cluster input gear C, to cluster first speed gear $C_1$ to shifter gear F, to output shaft 12. Likewise, rearward movement of the shifter gear F into engagement with the idler gear 46, that meshes with cluster reverse gear $C_r$, will transmit a reverse drive to the output shaft 12. As the shifter gear F is not engaged with the gears $C_1$ or $C_r$, except when drive is being transmitted therethrough, there is no problem of gear rattle noise from these gears due to make-and-break gear tooth contact such as is the case when direct or third speed forward drive is being transmitted and the cluster input gear C and the second speed gears $C_2$, S are rotatively engaged but not torque loaded.

The rear end portion of the input shaft pinion gear P is provided with a splined portion 51 that is adapted to be drivingly connected to the output shaft clutch sleeve 14, as shown in FIG. 2, to provide for the transmission of a direct or third speed forward drive from the input shaft 10 to the output shaft 12. Clutch sleeve 14 is spline connected at 52 to the clutch gear 16. Clutch gear 16 is drivingly connected to the output shaft 12 by internal teeth 54 that are slidably engaged in the helical or angled splines 28 that are formed on the forward portion of the output shaft 12. The angled splines 28 may extend at 10–20 degrees to the shaft axis, but this angle can vary materially. The action of these angled splines 28 in combination with the friction washer 22, as will be explained hereafter, is the crux of this invention.

Rearwardly of and adjacent the clutch gear 16 is the second speed forward drive gear S. This gear S is rotatably mounted on the surface portion 20 of the output shaft so that it is free to rotate relative to and shift axially of the output shaft 12. This second speed gear S has a toothed forward portion 61 that is adapted to be drivingly connected to the clutch sleeve 14 when the sleeve 14 is shifted rearwardly. Under such a condition the second speed gear S is then connected to the output shaft 12 for the transmission of a second speed forward drive from the pinion P to the cluster gear C, to the cluster second speed gear $C_2$, to the second speed gear S, through the clutch sleeve 14 and clutch gear 16, to the output shaft 12.

It will be noted that the rear side of the second speed gear S is recessed as shown at 65 to provide a space to mount the friction washer 22 and the Belleville-type, dished, spring washer 66. The recess 65 in the rear face of the gear S provides space for the rearward axial shift of the gear S as the spring washer 66 is flattened out as shown in FIG. 2. Obviously the recess 65 could be omitted if the width of the gear S were reduced or the portion 20 of the output shaft elongated. The important point is that the gear S is arranged on the output shaft 12 for limited axial movement relative thereto.

With the arrangement shown, when the transmission is conditioned for direct or third speed forward drive, the application of drive torque from the drive pinion P through the clutch sleeve 14 to the clutch gear 16 causes the clutch gear 16 to move rearwardly along the helical splines 28 and to push the floating second speed gear S rearwardly against the friction washer 22 and spring washer 66. The clutch gear 16 and second speed gear S will assume the positions shown in FIG. 2 when direct drive is being transmitted and this will cause a friction loading of the gear S by the compressed spring washer 66 and the engaged friction washer 22. Under such circumstances the teeth of the cluster gears C and $C_2$ will not oscillate relative to the teeth of the pinion P and second speed gear S and gear rattle noise will not develop.

It might be questioned as to whether gear rattle noise might develop when either first speed forward drive or reverse drive is transmitted because at such times the gears $C_2$ and S are not torque loaded. However, no real gear noise problem develops during first speed or reverse drive because at such times the engine speed is relatively high so that cylinder firing pulsations are less likely to be transmitted and furthermore first speed and reverse drive are normally used for such short periods of time that nothing of a gear rattle noise problem has been found to exist in transmissions of the disclosed type. It appears that you pass through the first speed or reverse drive ratio so fast and at such relatively high engine speeds as compared to direct drive engine speeds that there is no problem of gear rattle noise in either of these ratios.

As previously mentioned, with the construction shown there is a means provided to friction load the second speed gear S, when the transmission is conditioned for third speed forward or direct drive, so that the countershaft gears $C_2$ and C that are not, under torque during direct drive, will not produce gear rattle. The friction loading of the cluster second speed gear $C_2$ is transmitted to the connected, free running, cluster input gear C during direct drive so no rattle noise develops between the teeth of gears P and C during direct drive.

While there have been other attempts to eliminate gear rattle noise by friction loading these prior attempts usually applied a continuously acting friction loading on the several gears and this continuous loading caused difficulties in the desired shifting characteristics of the transmission. With the design herein disclosed it will be noted that the friction loading applied by the spring washer 66 is not applied until after the shift has been completed and torque is being transmitted in direct drive because it is the transmission of torque in direct drive that actuates the shiftable clutch gear 16 and floating second speed gear S and moves these gears rearwardly on the output shaft 12 to cause flattening of the spring washer 66 and loading of the friction washer 22 against the second speed gear S. This is an important feature that is thought to distinguish this invention from anything that may have been previously attempted to eliminate gear rattle by friction loading.

It will be noted that the shift of the clutch sleeve 14 forwardly and rearwardly to alternately selected third speed and second speed forward drive, respectively, actuates a synchronizer link 63 that is connected to the gear carried synchronizer rings 67 and 68. This type of synchronizer assembly is well known in the transmission field and as it is not a part of the invention herein claimed, it is not thought that a detailed description thereof is necessary. However, it should be pointed out that the synchronizers 67, 68 operate to assist in making clutched engagement between the clutch gear sleeve 14 and the gear carried clutch portions 51 and 61 of the pinion P and second speed gear S respectively. As actuation of the gear S rearwardly along the output shaft 12 occurs after clutched engagement of the sleeve 14 with the pinion section 51, it is thought to be obvious that the axial movement of the gear S does not affect the operation of the synchronizing means.

It has been found advantageous to drivingly connect the friction washer 22 to the output shaft 12 to prevent relative rotation therebetween so that the side face of washer 22 will be effective for friction damping against gear side portion 65. Also, it has been found advantageous to limit the amount of friction damping by providing a ring stop 88 that limits the rearward axial shift of clutch gear 16. Stop 88 prevents build-up in the damping action of washer 22 in proportion to the torque being transmitted by the clutch gear 16.

I claim:

1. In a transmission, a rotatable input shaft with a drive pinion and clutch means thereon, a rotatable output shaft with an axially shiftable clutch gear drivingly connected thereto, a clutch sleeve axially shiftable and drivingly mounted on said clutch gear, and another gear mounted on the output shaft adjacent said clutch gear shiftable axially of and rotatable relative to said output shaft with said other gear having clutch means thereon, axial shift of said clutch sleeve being effective to selectively clutch said input shaft and said other gear to said output shaft, a unitary countershaft gear cluster rotatably supported adjacent said input and output shafts having a first gear meshingly engaged with said input shaft drive pinion and a second gear meshingly engaged with said output shaft mounted other gear, and means to frictionally engage said output shaft mounted other gear and prevent gear rattle noise, said friction means being arranged adjacent to and adapted to be applied to said other gear by axial shift of said other gear on said output shaft.

2. In a transmission, a rotatable input shaft with a drive pinion and clutch means thereon, a rotatable output shaft with an axially shiftable clutch gear drivingly connected thereto, a clutch sleeve axially shiftable and drivingly mounted on said clutch gear, and another gear mounted on the output shaft adjacent said clutch gear shiftable axially of and rotatable relative to said output shaft with said other gear having clutch means thereon, axial shift of said clutch sleeve being effective to selectively clutch said input shaft and said other gear to said output shaft, a unitary countershaft gear cluster rotatably supported adjacent said input and output shafts having a first gear meshingly engaged with said input shaft drive pinion and a second gear meshingly engaged with said output shaft mounted other gear, and means to frictionally engage said output shaft mounted other gear and prevent gear rattle noise, said friction means being arranged adjacent to and adapted to be applied to said other gear by the axial shift of said clutch gear towards said other gear.

3. In a transmission, a rotatable input shaft with a drive pinion and clutch means thereon, a rotatable output shaft with an axially shiftable clutch gear drivingly connected thereto, a clutch sleeve axially shiftable and drivingly mounted on said clutch gear, and another gear mounted on the output shaft adjacent said clutch gear shiftable axially of and rotatable relative to said output shaft with said other gear having clutch means thereon, axial shift of said clutch sleeve being effective to selectively clutch said input shaft and said other gear to said output shaft, a unitary countershaft gear cluster rotatably supported adjacent said input and output shafts having a first gear meshingly engaged with said input shaft drive pinion and a second gear meshingly engaged with said output shaft mounted other gear, and friction means on said output shaft to frictionally engage said output shaft mounted other gear and prevent gear rattle noise, said friction means being arranged to be applied to said other gear by the axial shift of said clutch gear towards said other gear as a result of torque transmission by said clutch gear.

4. In a transmission, a rotatable input shaft with a drive pinion and clutch means thereon, a rotatable output shaft with an axially shiftable clutch gear drivingly connected thereto, a clutch sleeve axially shiftable and drivingly mounted on said clutch gear, and another gear mounted on the output shaft adjacent said clutch gear shiftable axially of and rotatable relative to said output shaft with said other gear having clutch means thereon, axial shift of said clutch sleeve being effective to selectively clutch said input shaft and said other gear to said output shaft, a unitary countershaft gear cluster rotatably supported adjacent said input and output shafts having a first gear meshingly engaged with said input shaft drive pinion and a second gear meshingly engaged with said output shaft mounted other gear, and means adjacent said other gear shiftable to frictionally engage said output shaft mounted other gear and prevent gear rattle noise, said friction means being arranged to be applied to said other gear by the axial shift of said clutch gear towards said other gear as a result of torque transmission by said clutch gear when said clutch gear is engaged with the clutch means on said input shaft.

5. In a countershaft-type transmission gear box, a rotatable input shaft mounting a drive pinion and a clutch means, a rotatable output shaft coaxial with said input shaft having a clutch mechanism axially shiftable thereon and adapted to be engaged with the input shaft clutch means to drivingly connect said shafts for direct drive, said clutch mechanism being connected to said output shaft by a grooved connection extending longitudinally of and at an angle to the axis of rotation of said output shaft, a gear rotatably mounted on said output shaft adjacent said clutch mechanism, said gear having a clutch means adapted to be drivingly engaged with said output shaft mounted clutch mechanism, a unitary countershaft gear cluster rotatably mounted on an axis extending parallel to said input and output shafts, said countershaft gear cluster having a first gear in meshed engagement with said input shaft drive pinion and a second gear in meshed engagement with said gear on said output shaft, and friction means carried by said output shaft arranged to be applied to said output shaft gear as a result of drive torque induced axial shift of said clutch mechanism when direct drive is transmitted between said input and output shaft to prevent gear rattle between the unloaded, meshingly engaged, gears.

6. In a transmission, a rotatable input shaft with a drive pinion and clutch means thereon, a rotatable output shaft with an axially shiftable clutch gear drivingly connected thereto, a clutch sleeve axially shiftable and drivingly mounted on said clutch gear, and another gear mounted on the output shaft adjacent said clutch gear shiftable axially of and rotatable relative to said output shaft with said other gear having clutch means thereon, axial shift of said clutch sleeve being effective to selectively clutch said input shaft and said other gear to said output shaft, a unitary countershaft gear cluster rotatably supported adjacent said input and output shafts having a first gear meshingly engaged with said input shaft drive pinion and a second gear meshingly engaged with said output shaft mounted other gear, and means arranged adjacent said other gear to frictionally engage said output shaft mounted other gear and prevent gear rattle noise, said friction means being arranged to be applied to said output shaft mounted gear as a result of axial shift of said output shaft gear due to axial shift of said clutch mechanism when torque load is transmitted thereby.

7. In a transmission, a rotatable input shaft with a drive pinion and clutch means thereon, a rotatable output shaft with an axially shiftable clutch gear drivingly conected thereto, a clutch sleeve axially shiftable and drivingly mounted on said clutch gear, and another gear mounted on the output shaft adjacent said clutch gear shiftable axially of and rotatable relative to said output shaft with said other gear having clutch means thereon, axial shift of said clutch sleeve being effective to selectively clutch said input shaft and said other gear to said output shaft, a unitary countershaft gear cluster rotatably supported adjacent said input and output shafts having a first gear meshingly engaged with said input shaft drive pinion and a second gear meshingly engaged with said output shaft mounted other gear, and means carried by said output shaft and actuable to frictionally engage said output shaft mounted other gear and prevent gear rattle noise, said friction means being arranged to be applied to said output shaft mounted gear as a result of axial shift of said output shaft gear due to axial shift of said clutch mechanism when torque load is transmitted thereby for direct drive.

8. In a transmission, a rotatable input shaft with a drive pinion and clutch means thereon, a rotatable output shaft with an axially shiftable clutch gear drivingly connected thereto, a clutch sleeve axially shiftable and drivingly mounted on said clutch gear, and another gear mounted on the output shaft adjacent said clutch gear shiftable axially of and rotatable relative to said output shaft with said other gear having clutch means thereon, axial shift of said clutch sleeve being effective to selectively clutch said input shaft and said other gear to said output shaft, a unitary countershaft gear cluster rotatably supported adjacent said input and output shafts having a first gear meshingly engaged with said input shaft drive pinion and a second gear meshingly engaged with said output shaft mounted other gear, and means to frictionally engage said output shaft mounted other gear and prevent gear rattle noise, said friction means being arranged to be applied to said output shaft mounted gear as a result of axial shift of said output shaft gear due to axial shift of said clutch mechanism when torque load is transmitted thereby and comprising a friction means mounted on said output shaft and arranged to be brought into abutting engagement with a side face portion of said output shaft gear to limit axial shift thereof in one direction.

9. In a transmission, a rotatable input shaft with a drive pinion and clutch means thereon, a rotatable output shaft with an axially shiftable clutch gear drivingly connected thereto, a clutch sleeve axially shiftable and drivingly mounted on said clutch gear, and another gear mounted on the output shaft adjacent said clutch gear shiftable axially of and rotatable relative to said output shaft with said other gear having clutch means thereon, axial shift of said clutch sleeve being effective to selectively clutch said input shaft and said other gear to said output shaft, a unitary countershaft gear cluster rotatably supported adjacent said input and output shafts having a first gear meshingly engaged with said input shaft drive pinion and a second gear meshingly engaged with said output shaft mounted other gear, and means to frictionally engage said output shaft mounted other gear and prevent gear rattle noise, said friction means being arranged to be applied to said output shaft mounted gear as a result of axial shift of said output shaft gear due to axial shift of said clutch mechanism when torque load is transmitted thereby and comprising a resiliently supported friction means mounted on said output shaft and arranged to be brought into abutting engagement with a side face portion of said output shaft gear to limit axial shift thereof in one direction.

10. In a transmission, a rotatable input shaft with a drive pinion and clutch means thereon, a rotatable output shaft with an axially shiftable clutch gear drivingly connected thereto, a clutch sleeve axially shiftable and drivingly mounted on said clutch gear, and another gear mounted on the output shaft adjacent said clutch gear shiftable axially of and rotatable relative to said output shaft with said other gear having clutch means thereon, axial shift of said clutch sleeve being effective to selectively clutch said input shaft and said other gear to said output shaft, a unitary countershaft gear cluster rotatably supported adjacent said input and output shafts having a first gear meshingly engaged with said input shaft drive pinion and a second gear meshingly engaged with said output shaft mounted other gear, and means to frictionally engage said output shaft mounted other gear and prevent gear rattle noise, said friction means being arranged to be applied to said output shaft mounted gear as a result of axial shift of said output shaft gear due to axial shift of said clutch gear when torque load is transmitted thereby and comprising a friction means mounted on said output shaft and arranged to be brought into abutting engagement with a side face portion of said output shaft gear to limit axial shift thereof in one direction and comprising a friction washer and an adjacent dished spring washer mounted on said output shaft adjacent a side face portion of said output shaft gear and arranged to be brought into abutting engagement with said output gear side face portion to limit axial movement thereof in one direction.

11. In a countershaft type transmission, a rotatable input shaft having a drive pinion and clutch means thereon, a coaxial rotatable output shaft having longitudinally extending helical splineways along at least a portion of its peripheral surface, a clutch gear mounted on and drivingly connected to said output shaft splineways for shiftable movement therealong, a gear mounted on said output shaft adjacent said clutch gear and free to rotate relative to said output shaft, said output shaft mounted gear having clutch means thereon, a clutch sleeve drivingly connected to said clutch gear for the transmission of torque thereto and shiftable axially thereof for selective clutching engagement with the clutch means on said input shaft and the output shaft mounted gear, a unitary countershaft gear cluster rotatably mounted on an axis parallel to the input and output shafts and having a cluster input gear meshingly engaged with said input shaft drive pinion and a second cluster gear meshingly engaged with said output shaft mounted gear, and friction means mounted on said output shaft arranged to be forcibly engaged with said output shaft mounted gear when said clutch gear is shifted axially towards said ouput shaft mounted gear as a result of torque transmission directly from said input shaft to said output shaft through said clutch sleeve.

12. In a transmission, a rotatable input shaft having a drive pinion thereon, a rotatable output shaft with an axially shiftable clutch gear drivingly connected thereto, a clutch sleeve axially shiftable and drivingly mounted on said clutch gear, another gear mounted on the output shaft adjacent said clutch gear and shiftable axially of and rotatable relative to said output shaft, axial shift of said clutch sleeve being effective to selectively clutch said input shaft and said other gear to said output shaft, a countershaft gear cluster rotatably supported adjacent said input and output shafts having a first gear continuously engaged with said input shaft drive pinion and a second gear continuously engaged with said output shaft mounted other gear, and means arranged to be actuated to frictionally engage at least one of said gears and prevent gear rattle noise of the continuously engaged gears, said friction means being arranged to be applied by the axial shift of one of said axially shiftable gears as a result of torque transmission by said clutch gear.

13. In a transmission, a rotatable input shaft having a drive pinion thereon, a rotatable output shaft with an axially shiftable clutch gear drivingly connected thereto by an angled spline connection, a clutch sleeve axially shiftable on and drivingly connected to said clutch gear, another gear mounted on the output shaft adjacent said clutch gear and rotatable relative to said output shaft, axial shift of said clutch sleeve being effective to selectively clutch said input shaft and said other gear to said output shaft, a countershaft gear cluster rotatably supported adjacent said input and output shafts having a first gear meshingly engaged with said input shaft drive pinion and a second gear meshingly engaged with said output shaft mounted other gear, and means actuable to frictionally engage one of said meshingly engaged gears and prevent gear rattle noise, said friction means being arranged to be applied to said one gear by the axial shift of said clutch gear along said angled spline connection as a result of torque transmission by said clutch gear.

References Cited in the file of this patent
UNITED STATES PATENTS

| | | |
|---|---|---|
| 2,062,930 | Pritchard | Dec. 1, 1936 |
| 2,301,448 | Peterson et al | Nov. 10, 1942 |